United States Patent
Sueishi (10) Patent No.: US 10,137,740 B2
(45) Date of Patent: Nov. 27, 2018

(54) MOTORCYCLE TIRE FOR RUNNING ON ROUGH TERRAIN

(71) Applicant: Sumitomo Rubber Industries, Ltd., Kobe-shi, Hyogo (JP)

(72) Inventor: Makoto Sueishi, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 171 days.

(21) Appl. No.: 15/188,126

(22) Filed: Jun. 21, 2016

(65) Prior Publication Data

US 2017/0008350 A1   Jan. 12, 2017

(30) Foreign Application Priority Data

Jul. 6, 2015   (JP) .................................. 2015-134985

(51) Int. Cl.
  *B60C 11/11* (2006.01)
  *B60C 11/03* (2006.01)
  *B60C 11/00* (2006.01)

(52) U.S. Cl.
  CPC ....... *B60C 11/0332* (2013.01); *B60C 11/0311* (2013.01); *B60C 11/11* (2013.01); *B60C 11/0083* (2013.01); *B60C 2200/10* (2013.01); *B60C 2200/14* (2013.01)

(58) Field of Classification Search
  CPC ............ B60C 2200/10; B60C 2200/14; B60C 11/0332; B60C 11/11; B60C 11/0306; B60C 11/0083; B60C 11/01; B60C 11/0311; B60C 11/0316
  USPC ............. 152/209.11, 209.14, 209.15, 209.16
  See application file for complete search history.

(56) References Cited

FOREIGN PATENT DOCUMENTS

| CN | 202826988 U | | 3/2013 |
|---|---|---|---|
| EP | 1498289 A1 | | 1/2005 |
| JP | 3-204308 | * | 9/1991 |
| JP | 2007-13111 A | | 5/2007 |
| JP | 2009-269421 | * | 11/2009 |

OTHER PUBLICATIONS

JP 3-204308, English language abstract and machine translation [epo.org] (Year: 1991).*
JP 2009-269421, English language abstract and machine translation [epo.org] (Year: 2009).*
Extended European Search Report, dated Dec. 7, 2016, for European Application No. 16175812.3.

* cited by examiner

*Primary Examiner* — Eric Hug
(74) *Attorney, Agent, or Firm* — Birch, Stewart, Kolasch & Birch, LLP (57) ABSTRACT

A motorcycle tire for running on rough terrain includes a tread portion being provided with a first block pair including a shoulder block and a middle block arranged adjacently in an axial direction of the tire through a first groove bottom having a first thinnest rubber portion. The shoulder block includes a ground contact surface with an axially inner edge and a tread edge. The middle block includes a ground contact surface with an axially outer edge. In a first tire cross-section passing the first block pair, a distance from the first thinnest rubber portion to the axially inner edge of the shoulder block is set greater than a distance from the first thinnest rubber portion to the axially outer edge of the middle block.

11 Claims, 6 Drawing Sheets

PRIOR ART

FIG.6(b)

MOTORCYCLE TIRE FOR RUNNING ON ROUGH TERRAIN

BACKGROUND ART

Field of the Invention

The present invention relates to motorcycle tires for running on rough terrain, and in particular relates to a motorcycle tire capable of exerting high grip performance when cornering.

Description of the Related Art

Japanese Unexamined Patent Application Publication No. 2007-131111 discloses a motorcycle tire for running on rough terrain which includes a tread portion provided with a plurality of blocks. Unfortunately, the motorcycle tire described above does not include a block pair that includes a shoulder block and a middle block arranged adjacently in the axial direction of the tire. Accordingly, the motorcycle tire having such a tread portion may be difficult to obtain sufficient grip performance when cornering with camber angles.

SUMMARY OF THE INVENTION

In view of the above problems in the conventional art, the present invention has an object to provide a motorcycle tire for running on rough terrain capable of exerting high grip performance when cornering.

According to one aspect of the invention, a motorcycle tire for running on rough terrain including a tread portion being provided with a first block pair including a shoulder block and a middle block arranged adjacently each other in an axial direction of the tire through a first groove bottom having a first thinnest rubber portion. The shoulder block includes a ground contact surface having an axially inner edge and a tread edge. The middle block includes a ground contact surface having an axially outer edge. In a first tire cross-section passing the first block pair, a distance from the first thinnest rubber portion to the axially inner edge of the shoulder block is greater than a distance from the first thinnest rubber portion to the axially outer edge of the middle block.

In another aspect of the invention, the tread portion may further be provided with a second block pair including a middle block and a central block arranged adjacently each other in the axial direction of the tire through a second groove bottom having a second thinnest rubber portion. The middle block of the second block pair may include a ground contact surface having an axially inner edge, and the central block may include a ground contact surface having an axially outer edge. In a second tire cross-section passing the second block pair, a distance from the second thinnest rubber portion to the axially inner edge of the middle block may be greater than a distance from the second thinnest rubber portion to the axially outer edge of the central block.

In another aspect of the invention, the tire may include a carcass having a toroidal profile, and the axially inner edge of the middle block of the second block pair may protrude radially outwardly beyond an imaginary tread profile that passes an intersecting point of the ground contact surface of the central block and a tire equator and extends along the toroidal profile of the carcass.

In another aspect of the invention, in the second tire cross-section, the ground contact surface of the middle block may extend in a straight shape.

In another aspect of the invention, in the second tire cross-section, the ground contact surface of the middle block may extend in an arc shape having a radius of curvature greater than that of the imaginary tread profile.

In another aspect of the invention, the tire may include a carcass having a toroidal profile, and the axially inner edge of the shoulder block may protrude radially outwardly beyond an imaginary tread profile that passes an intersecting point of the ground contact surface of the central block and a tire equator and extends along the toroidal profile of the carcass.

In another aspect of the invention, in the first tire cross-section, the ground contact surface of the shoulder block may extend in a straight shape.

In another aspect of the invention, in the first tire cross-section, the ground contact surface of the shoulder block may extend in an arc shape having a radius of curvature greater than that of the imaginary tread profile.

DESCRIPTION OF THE PREFERRED EMBODIMENTS

Figure 1:
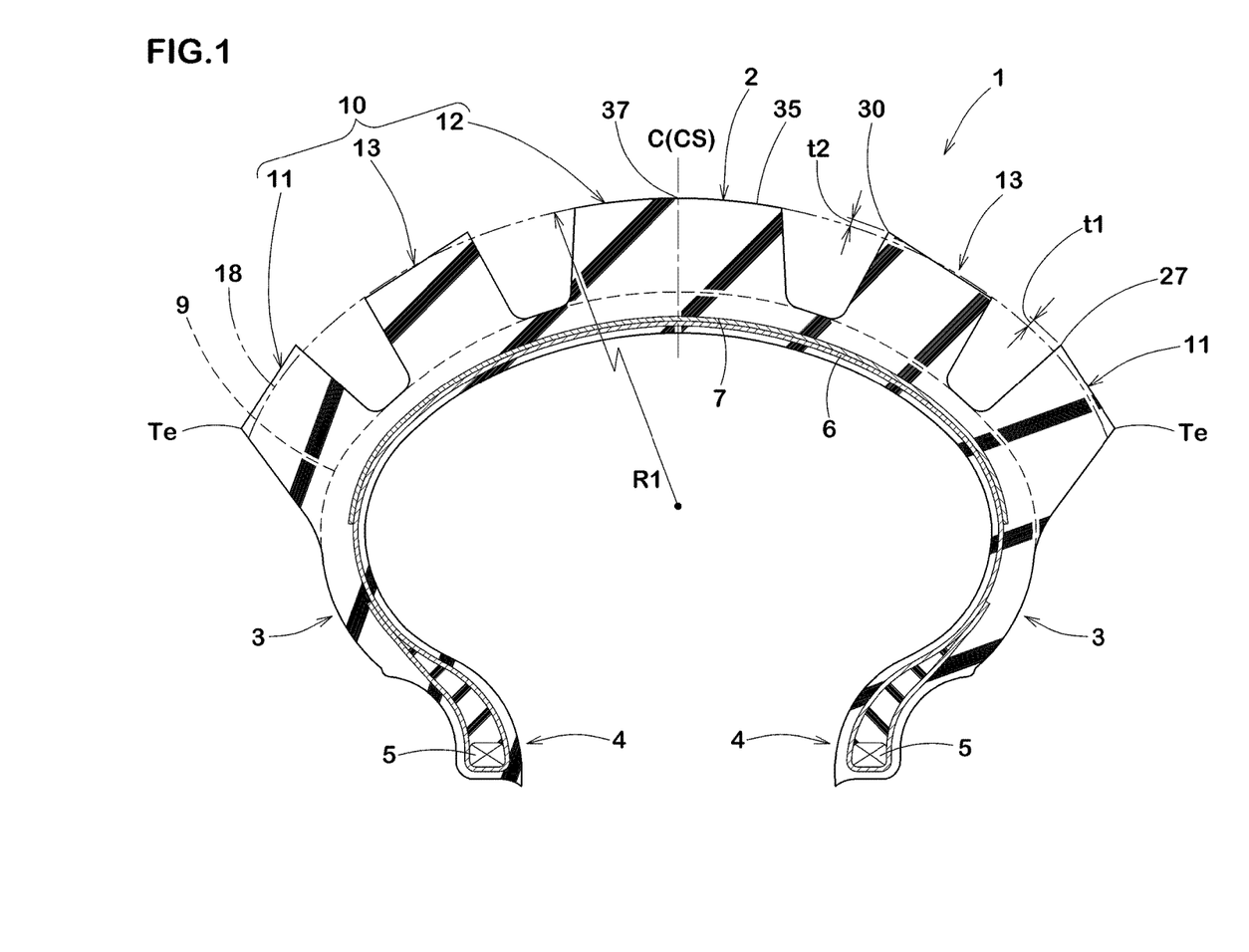
FIG. 1 is a cross-sectional view of a motorcycle tire for running on rough terrain according to an embodiment of the present invention.
Figure 2:
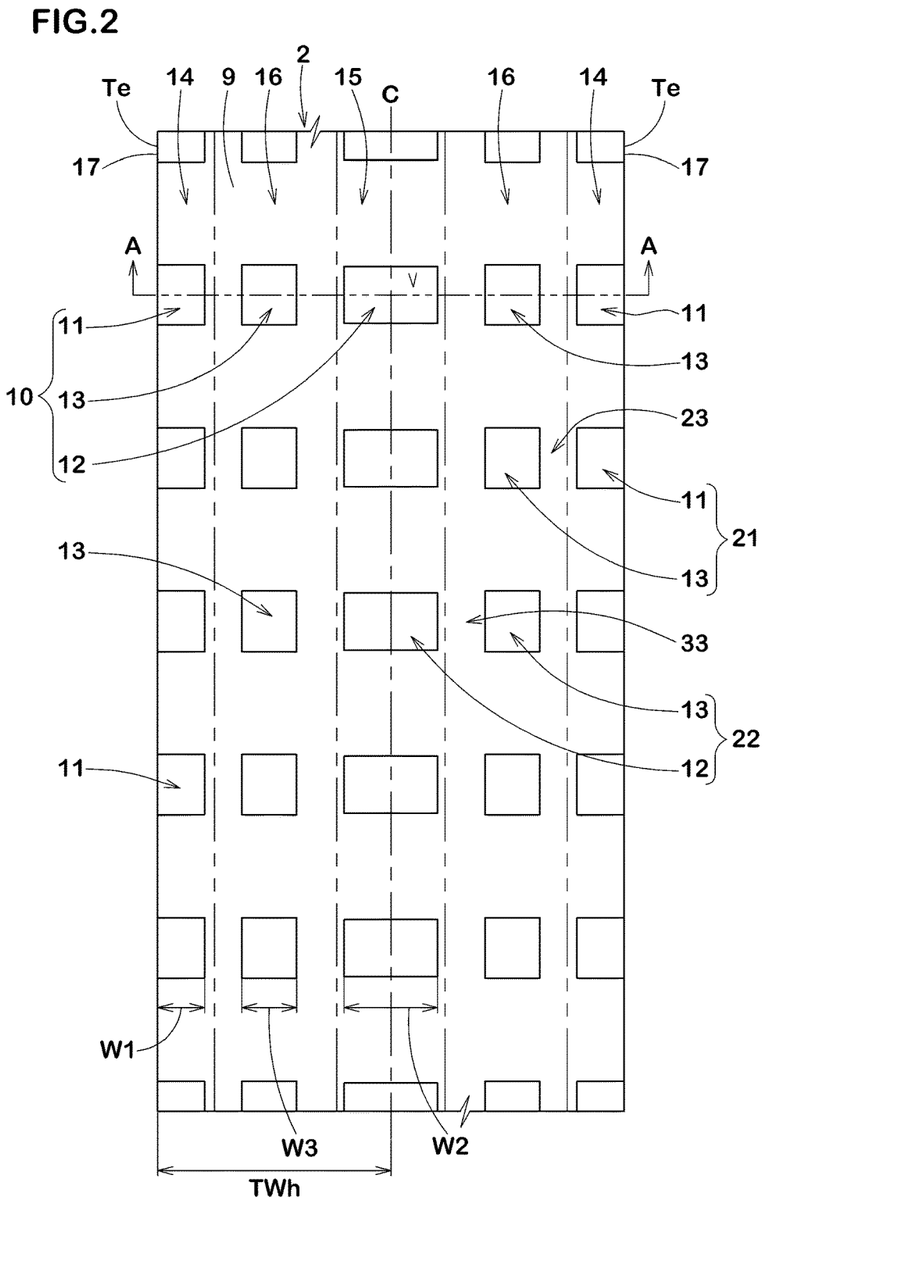
FIG. 2 is a development view of a tread portion of FIG. 1.

An embodiment of the present invention will be explained below with reference to the accompanying drawings. FIG. 1 illustrates a motorcycle tire 1 for running on rough terrain in accordance with the present embodiment as a motocross tire. FIG. 1 is a cross-sectional view of the tire 1 including a tire axis under a standard state. FIG. 2 is a development view of a tread portion 2 of the tire 1. The cross section taken along a line A-A of FIG. 2 corresponds to FIG. 1.

As used herein, the standard state is such that the tire 1 is mounted on a standard wheel rim (not illustrated) with a standard pressure, and is loaded with no tire load. Unless otherwise noted, various dimensions and positions of the tire 1 mean values measured at the standard state.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As illustrated in FIG. 1, the tire 1 according to the embodiment, for example, includes a carcass 6 and a belt layer 7. The carcass 6 is formed in a troidal shape extending between bead cores 5 disposed in bead portions 4 through the tread portion 2 and sidewall portions 3. The belt layer 7, for example, is disposed radially outward of the carcass 6 in the tread portion 2 to enhance the tread portion 2.

The tread portion 2 includes an outer surface between tread edges Te and Te, and the outer surface is curved so as to convex toward the radially outward of the tire. The tread portion 2 includes a plurality of blocks 10 that protrude from a groove bottom surface 9. The tread edge Te, for example, is an axially outermost edge of the blocks 10 arranged on the tread portion 2 on each side of the tire equator C.

The blocks 10, for example, include shoulder blocks 11, central blocks 12, and middle blocks 13. As illustrated in FIG. 2, each block 10 is arranged separately from one another in the circumferential direction of the tire.

Each shoulder block 11, for example, includes a ground contact surface having a centroid located within a shoulder region 14 on each side of the tire equator C. The shoulder region 14 is a region having a 25% width of a tread development half-width TWh from each tread edge Te. Here, the tread development half-width TWh is an axial distance from the tire equator C to one of the tread edges Te when the tread portion 2 is developed in a plane. In this embodiment, the axially outer edge 17 of each shoulder block 11 corresponds to the tread edge Te.

Each central block 12, for example, includes a ground contact surface having a centroid located within a central region 15. The central region 15 is a region having a 50% width of the tread development half-width TWh centered on the tire equator C. In this embodiment, the central blocks 12 are arranged on the tire equator C.

Each middle block 13 includes a ground contact surface having a centroid located within a middle region 16 between the shoulder region 14 and the central region 15 on each side of the tire equator C.

In this embodiment, the ground contact surface of each block 10 is configured as a rectangular shape with a pair of axially extending lateral edges and a pair of circumferentially extending longitudinal edges. Note that the shape of the ground contact surface of each block is not limited to the above aspect.

In this embodiment, an axial width of the ground contact surface of each block is set in a range of from 0.20 to 0.40 times the tread development half-width TWh, for example. In a preferred embodiment, the axial widths W2 of the ground contact surfaces of the central block 12 may be set greater than the axial widths W1 and W3 of the ground contact surfaces of the shoulder blocks 11 and the middle blocks 13 respectively in order to increase traction. For instance, each block height is preferably in a range of from 6 to 19 mm.

The groove bottom surface 9 includes a first groove bottom 23 formed between a row of shoulder blocks 11 and a row of middle blocks 13.

Furthermore, the tread portion 2 includes at least one first block pair 21 that includes one shoulder block 11 and one middle block 13 which are arranged adjacently each other in the axial direction of the tire through the first groove bottom 23. That is, the shoulder block 11 overlaps with the middle block 13 at least partially when the shoulder block 11 is projected onto the middle block 13 along the axial direction of the tire in the plan view. In this embodiment, the first block pair 21 is configured such that the entire shoulder block 11 overlaps with the middle block 13 when projected onto the middle block 13 in the axial direction of the tire.

Figure 3:
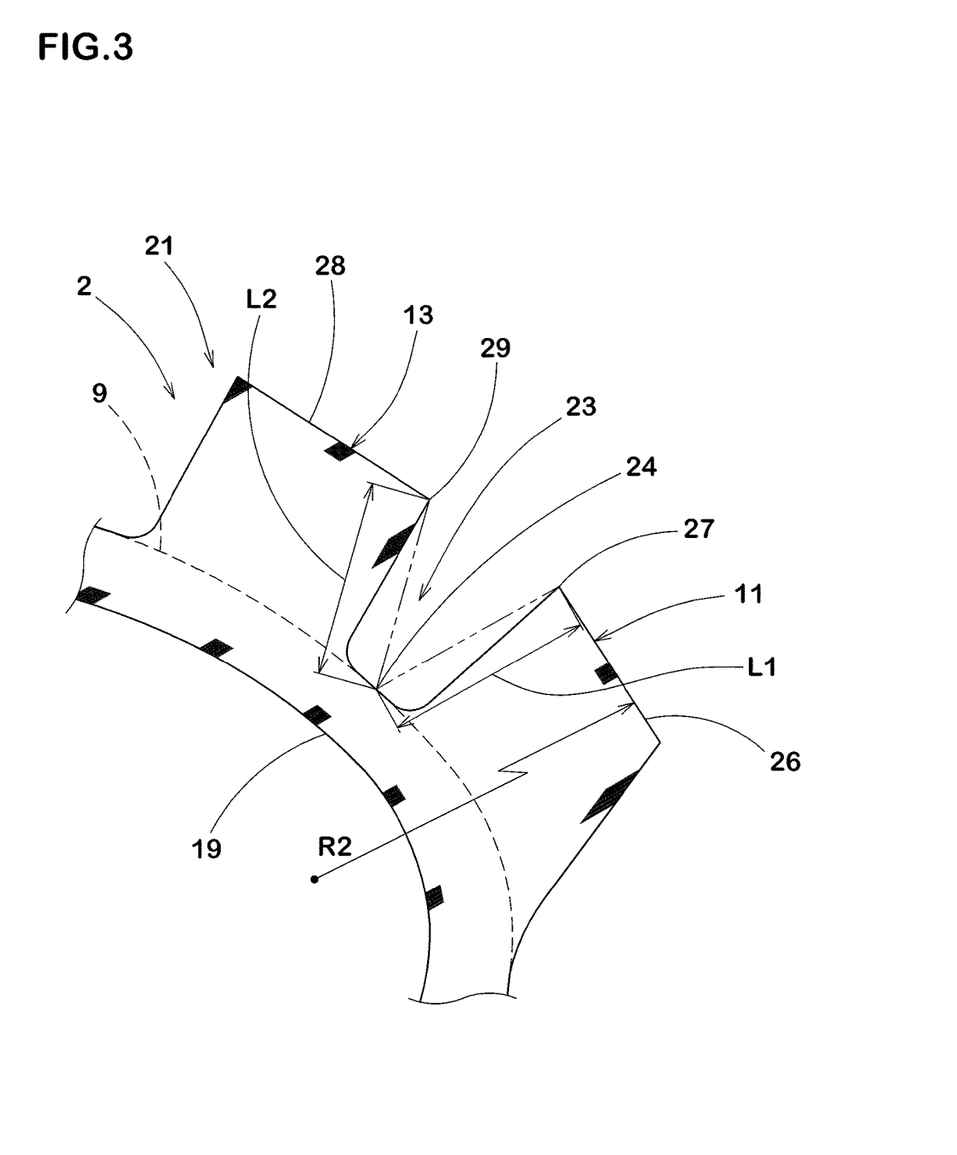
FIG. 3 is a first tire cross-section including a tire axis of a first block pair.

FIG. 3 illustrates a first tire cross-section including the tire axis of the first block pair 21. The first tire cross-section illustrated in FIG. 3 corresponds to an enlarged cross section of the right side shoulder and middle blocks 11 and 13 of FIG. 1. As illustrated in FIG. 3, the first groove bottom 23 includes a first thinnest rubber portion 24. In the first tire cross-section, the first thinnest rubber portion 24 is a point on the outer surface of the first groove bottom 23 where the minimum rubber thickness between the outer surface and an inner cavity surface 19 of the tire is provided. When the minimum rubber thickness is continuous over the axial direction of the tire on the first groove bottom 23, the first thinnest rubber portion 24 is defined as its middle point.

Figure 4:
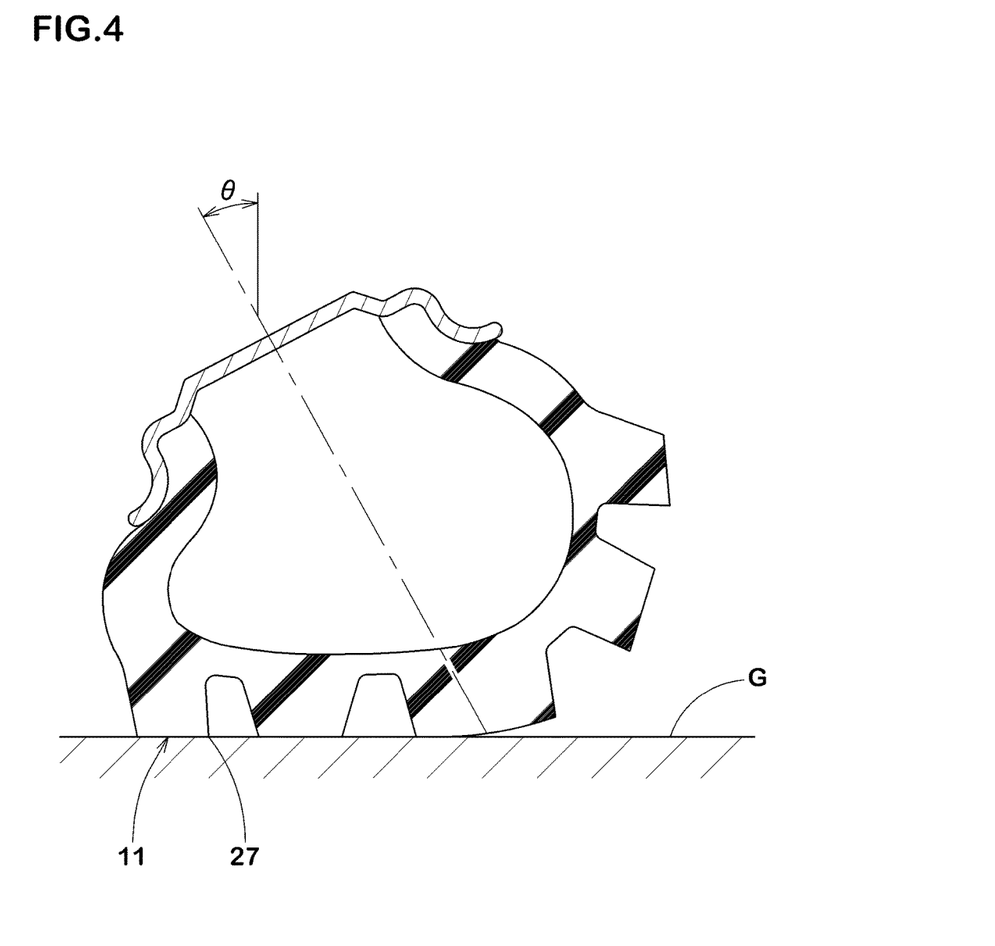
FIG. 4 is a cross-sectional view of a grounding state of blocks at the time of cornering.

In this embodiment, a distance L1 from the first thinnest rubber portion 24 to the axially inner edge 27 of the ground contact surface 26 of the shoulder block 11 is set greater than a distance L2 from the first thinnest rubber portion 24 to the axially outer edge 29 of the ground contact surface 28 of the middle block 13. As illustrated in FIG. 4, when the tire according to the embodiment turns with a large camber angle θ, the ground contact pressure acting on the axially inner edge 27 of the shoulder block 11 increases, and therefore the edge 27 would scratch the ground G strongly to generate large frictional force.

Generally, when the motorcycle tire for running on rough terrain having a tread portion 2 provided with a plurality of blocks 10 turns, most of the deformation of the tread portion 2 occurs on a groove bottom portion. In particular, the center of the deformation tends to be located at the thinnest rubber portion of the groove bottom. As a result of various experiments by the inventors, it has been found that the ground contact pressure acting on the axially inner edge 27 of the shoulder block 11 increases during cornering on a hard road when the distance L1 is set greater than the distance L2 in the first block pair 21 as illustrated in FIG. 3.

In a preferred embodiment, a ratio L1/L2 of the distance L1 to the distance L2 is in a range of from 1.05 to 1.15, more preferably in a range of from 1.07 to 1.10 in order to further improve the above effect. Furthermore, the tire according to the embodiment would generate camber thrust varying in a linear fashion with respect to camber angles during cornering to offer excellent leaning property to motorcycles.

As illustrated in FIG. 1, in a preferred embodiment, the axially inner edge 27 of the shoulder block 11 protrudes radially outwardly beyond an imaginary tread profile 18. The imaginary tread profile 18 is an imaginary profile that passes an intersecting point 37 of the ground contact surface 35 of the central block 12 and the tire equatorial plane CS and extends along a toroidal profile of the carcass 6. Thus, the axially inner edge 27 of the shoulder block 11 can scratch more strongly against the ground.

When a protruding amount t1 of the axially inner edge 27 of the shoulder block 11 from the imaginary tread profile 18 is excessively large, the contact feeling in feedback from the tire received by a rider may vary suddenly at the time that the shoulder block 11 comes into contact with the ground during cornering. For this reason, the protruding amount t1 is preferably less than 4.0 mm, and is more preferably set in a range of from 2.5 to 3.5 mm.

As illustrated in FIG. 3, in the first tire cross-section, the ground contact surface 26 of the shoulder block 11 preferably extends in a straight shape or an arc shape that has a radius R2 of curvature greater than a radius R1 (illustrated in FIG. 1) of curvature of the imaginary tread profile 18. Preferably, in case of the ground contact surface extending in an arc shape, the radius R2 is preferably equal to or more than 65 mm, for example. Accordingly, the inner edge 27 can scratch strongly against the ground. Furthermore, this configuration may generate large frictional force through the entire ground contact surface 26 of the shoulder block 11.

As illustrated in FIG. 2, in a preferred embodiment, the tread portion 2 further includes a second block pair 22 that includes one middle block 13 and one central block 12 which are arranged adjacently each other in the axial direction of the tire through a second groove bottom 33. That is, the middle block 13 overlaps with the central block 12 at least partially when the middle block 13 is projected onto the central block 12 along the axial direction of the tire in the plan view. In a preferred embodiment, the tread portion 2 includes a block arrangement that one shoulder block 11, one middle block 13 and one central block 12 are arranged adjacently with each other in the axial direction of the tire.

The groove bottom surface 9 further includes the second groove bottom 33 formed between the row of middle blocks 13 and a row of central blocks 12.

Figure 5:
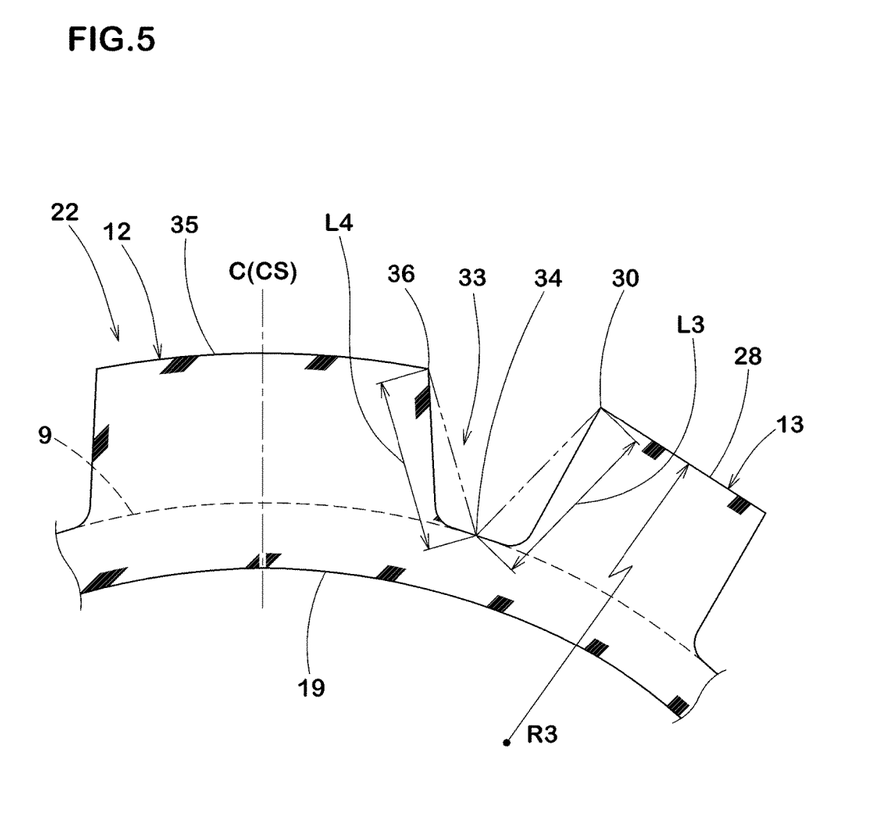
FIG. 5 is a second tire cross-section including the tire axis of a second block pair.

FIG. 5 illustrates a second tire cross-section including the tire axis of the second block pair 22. The second tire cross-section illustrated in FIG. 5 corresponds to an enlarged view of the right side middle and central blocks 13 and 12 of FIG. 1. As illustrated in FIG. 5, the second groove bottom 33 includes a second thinnest rubber portion 34. In the second tire cross-section, the second thinnest rubber portion 34 is a point on the outer surface of the second groove bottom 33 where the minimum rubber thickness between the outer surface and an inner cavity surface 19 of the tire is provided. When the minimum rubber thickness is continuous over the axial direction of the tire on the second groove bottom 33, the second thinnest rubber portion 34 is defined as its middle point.

In the second tire cross-section, a distance L3 from the second thinnest rubber portion 34 to the axially inner edge 30 of the ground contact surface 28 of the middle block 13 is set greater than a distance L4 from the second thinnest rubber portion 34 to the axially outer edge 36 of the ground contact surface 35 of the central block 12. Here, the outer edge 36 means an edge on the side of the concerned middle block 13 in the second block pair 22.

Figures 6A, 6B:
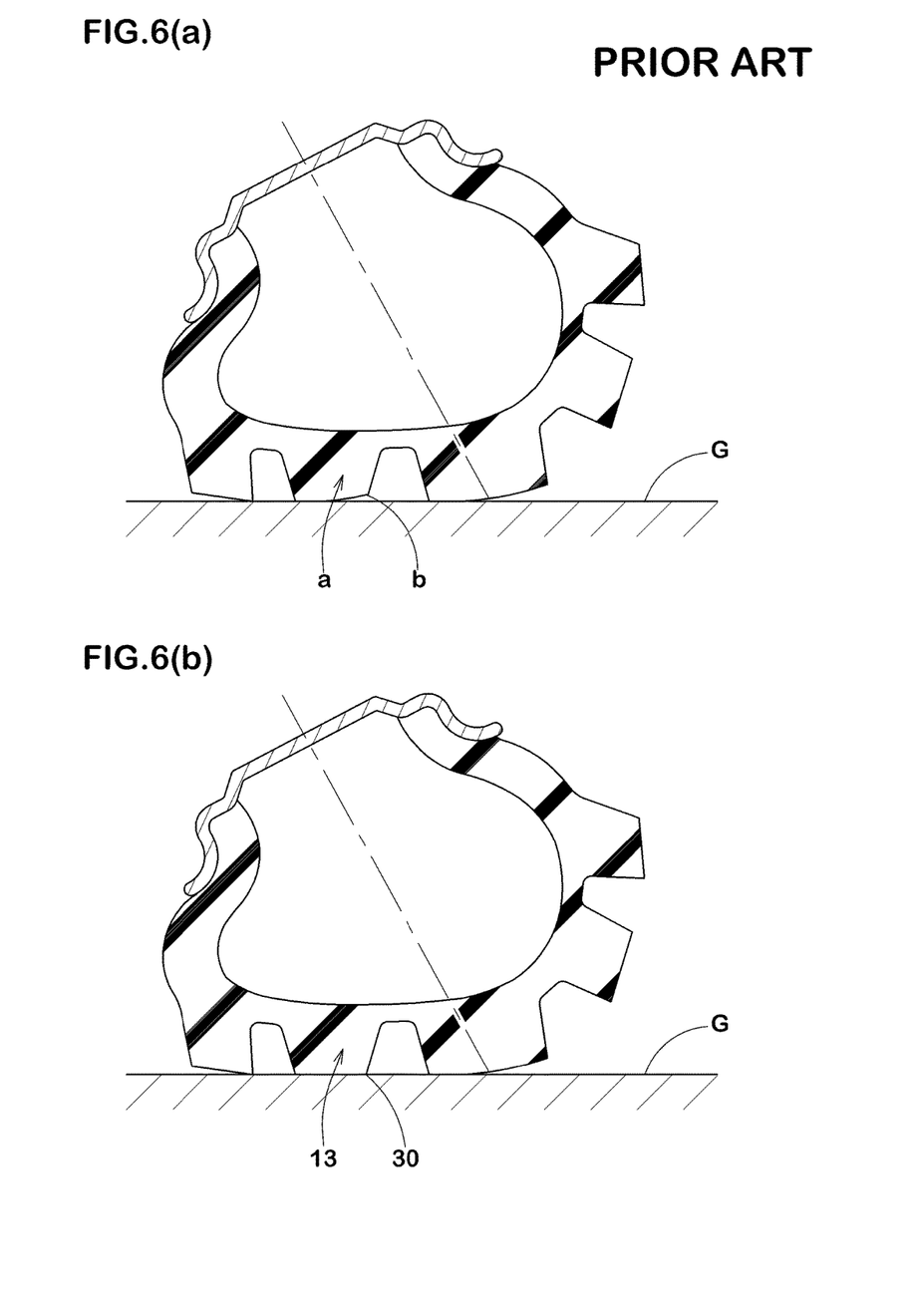
FIG. 6A is a cross-sectional view of a grounding state of blocks of a conventional tire at the time of cornering.
FIG. 6B is a cross-sectional view of a grounding state of blocks of an example tire at the time of cornering.

Generally, in conventional tires, the distance L3 tended to be smaller than the distance L4. The conventional tires, as illustrated in FIG. 6A, there is a problem that the grip performance during cornering is deteriorated since the axially inner edge (b) of the middle block (a) can not come into contact with the ground G. On the other hand, since the tire in accordance with the present embodiment includes the distance L3 greater than the distance L4, the axially inner edge 30 of the middle block 13 surely comes into contact with the ground G, as illustrated in FIG. 6B. Accordingly, the inner edge 30 can scratch against the ground G strongly to provide an excellent grip performance.

As illustrated in FIG. 5, in a preferred embodiment, a ratio L3/L4 of the distance L3 to the distance L4 is in a range of from 1.05 to 1.15, more preferably in a range of from 1.07 to 1.10 in order to further improve the above effects as well as leaning property of motorcycles.

As illustrated in FIG. 1, in a preferred embodiment, the axially inner edge 30 of the middle block 13 protrudes radially outwardly beyond the imaginary tread profile 18. Thus, the inner edge 30 of the middle block 13 can scratch more strongly. The protruding amount t2 of the axially inner edge 30 of the middle block 13 is preferably less than 4 mm, and is more preferably set in a range of from 2.5 to 3.5 mm. This configuration may be useful to offer a linear feedback from the tire during cornering to a rider.

In a preferred embodiment, the protruding amount t2 of the inner edge 30 of the middle block 13 is smaller than the protruding amount t1 of the inner edge 27 of the shoulder block 11. Thus, when the shoulder block 11 comes into contact with the ground during cornering, the camber angle can be converged so as to offer excellent leaning property of motorcycles.

As illustrated in FIG. 5, in the second tire cross-section, the ground contact surface 28 of the middle block 13 preferably extends in a straight shape or an arc shape that has a radius R3 of curvature greater than the radius R1 (illustrated in FIG. 1) of curvature of the imaginary tread profile 18. Preferably, the radius R3 is equal to or more than 65 mm, for example. Accordingly, the inner edge 30 of the ground contact surface 28 of the middle block 13 can scratch strongly against the ground. Furthermore, this configuration may generate large frictional force through the entire ground contact surface 28 of the middle block 13.

In order to further improve the above effects, the tread portion 2 preferably has a land ratio of from 5% to 35%. As used herein, the land ratio is a ratio Sb/St of a total net area "Sb" of the ground contact surfaces of the blocks 10 to a whole gross area "St" of the tread portion 2 where all grooves are filled up.

While the particularly preferable embodiments in accordance with the present invention have been described in detail, the present invention is not limited to the illustrated embodiments, but can be modified and carried out in various aspects.

EXAMPLE

Motorcycle tire for running on rough terrain having a basic tread pattern illustrated in FIG. 2 and a basic structure of FIG. 1 were manufactured based on the details as shown in Table 1 for a rear wheel. As for the comparative examples, tires having the distance L1 from the first thinnest rubber portion to the axially inner edge of the shoulder block being smaller than the distance L2 from the first thinnest rubber portion to the axially outer edge of the middle block was also manufactured. Then, grip performance, traction and leaning performance of each test tire was tested. The common specifications are as follows.

Displacement of test motorcycle: 450 cc
Tire size: 120/80-19
Rim size: 2.15×19
Internal pressure: 80 kPa
Radius of imaginary tread profile: 65 mm Test Method:

Each test tire was mounted on the test motorcycle, and then a rider drove the motorcycle on a test course of rough terrain to evaluate grip performance, traction and leaning performance by his feeling. The results are indicated in Table 1 using an index based on Ref. being 100. The larger the value, the better each performance is. The test results are shown in Table 1.

From the test results, it was confirmed that the example tires improved in grip performance during cornering.

TABLE 1

|  | Ref. | Ex. 1 | Ex. 2 | Ex. 3 | Ex. 4 | Ex. 5 | Ex. 6 |
|---|---|---|---|---|---|---|---|
| Distance L1 (mm) | 17.5 | 21.0 | 20.0 | 22.0 | 23.0 | 21.0 | 21.0 |
| Distance L2 (mm) | 19.0 | 19.0 | 19.0 | 19.0 | 19.0 | 19.0 | 19.0 |
| Distance L3 (mm) | 17.5 | 21.0 | 20.0 | 22.0 | 23.0 | 21.0 | 21.0 |
| Distance L4 (mm) | 19.0 | 19.0 | 19.0 | 19.0 | 19.0 | 19.0 | 19.0 |
| Protruding amount t1 of inner edge of shoulder block (mm) | −1.4 | 3.3 | 2.4 | 4.2 | 5.1 | 3.3 | 3.3 |

TABLE 1-continued

|  | Ref. | Ex. 1 | Ex. 2 | Ex. 3 | Ex. 4 | Ex. 5 | Ex. 6 |
|---|---|---|---|---|---|---|---|
| Protruding amount t2 of inner edge of middle block (mm) | −1.4 | 3.3 | 2.4 | 4.2 | 5.1 | 3.3 | 3.3 |
| Radius R2 of ground contact surface of shoulder block (mm) | 65.0 | 65.0 | 65.0 | 65.0 | 65.0 | 55.0 | 100.0 |
| Radius R3 of ground contact surface of middle block (mm) | 65.0 | 65.0 | 65.0 | 65.0 | 65.0 | 55.0 | 100.0 |
| Grip performance during cornering (score) | 100 | 110 | 107 | 110 | 111 | 110 | 110 |
| Traction (score) | 100 | 100 | 100 | 99 | 98 | 99 | 100 |
| Leaning performance (score) | 100 | 102 | 102 | 100 | 98 | 102 | 102 |

What is claimed is:

1. A motorcycle tire for running on rough terrain comprising:
   a tread portion, a sidewall portion and a carcass having a toroidal profile;
   the tread portion being provided with a first block pair comprising a shoulder block and a middle block arranged adjacently to each other in an axial direction of the tire through a first groove bottom having a first thinnest rubber portion, and a central block arranged axially inwardly of the middle block;
   the shoulder block comprising a ground contact surface having an axially inner edge and an axially outer edge corresponding to a tread edge that locates axially outermost of the tire beyond the sidewall portion;
   the middle block comprising a ground contact surface having an axially outer edge and an axially inner edge;
   wherein
   in a first tire cross-section passing the first block pair, a distance from the first thinnest rubber portion to the axially inner edge of the shoulder block is greater than a distance from the first thinnest rubber portion to the axially outer edge of the middle block; and
   the axially inner edge of the middle block protrudes radially outwardly beyond an imaginary tread profile that passes an intersecting point of a ground contact surface of the central block, and a tire equator and extends along the toroidal profile of the carcass.

2. The motorcycle tire for running on rough terrain according to claim 1, wherein
   the tread portion is further provided with a second block pair comprising the middle block and the central block arranged adjacently each other in the axial direction of the tire through a second groove bottom having a second thinnest rubber portion,
   the ground contact surface of the central block has an axially outer edge, and
   in a second tire cross-section passing the second block pair, a distance from the second thinnest rubber portion to the axially inner edge of the middle block is greater than a distance from the second thinnest rubber portion to the axially outer edge of the central block.

3. The motorcycle tire for running on rough terrain according to claim 2, wherein in the second tire cross-section, the ground contact surface of the middle block extends in a straight shape.

4. The motorcycle tire for running on rough terrain according to claim 2, wherein in the second tire cross-section, the ground contact surface of the middle block extends in an arc shape having a radius of curvature greater than that of the imaginary tread profile.

5. The motorcycle tire for running on rough terrain according to claim 1, wherein the axially inner edge of the shoulder block protrudes radially outwardly beyond an beyond the imaginary tread profile.

6. The motorcycle tire for running on rough terrain according to claim 1, wherein in the first tire cross-section, the ground contact surface of the shoulder block extends in a straight shape.

7. The motorcycle tire for running on rough terrain according to claim 1, wherein in the first tire cross-section, the ground contact surface of the shoulder block extends in an arc shape having a radius of curvature greater than that of the imaginary tread profile.

8. A motorcycle tire for running on rough terrain comprising:
   a tread portion, a sidewall portion and a carcass having a toroidal profile;
   the tread portion being provided with a second block pair comprising a middle block and a central block arranged adjacently in the axial direction of the tire through a second groove bottom having a second thinnest rubber portion, and a shoulder block arranged axially outwardly of the middle block and comprising a ground contact surface having an axially outer edge corresponding to a tread edge that locates axially outermost of the tire beyond the sidewall portion;
   the middle block comprising a ground contact surface having an axially inner edge;
   the central block comprising a ground contact surface having an axially outer edge;
   in a second tire cross-section passing the second block pair, a distance from the second thinnest rubber portion to the axially inner edge of the middle block being greater than a distance from the second thinnest rubber portion to the axially outer edge of the central block; and
   the axially inner edge of the middle block protruding radially outwardly beyond an imaginary tread profile that passes an intersecting point of the ground contact surface of the central block and a tire equator and extends along the toroidal profile of the carcass.

9. The motorcycle tire for running on rough terrain according to claim 8, wherein in the second tire cross-section, the ground contact surface of the middle block extends in a straight shape.

10. The motorcycle tire for running on rough terrain according to claim 8, wherein in the second tire cross-section, the ground contact surface of the middle block extends in an arc shape having a radius of curvature greater than that of the imaginary tread profile.

11. The motorcycle tire for running on rough terrain according to claim 8, wherein the ground contact surface of the shoulder block comprises an axially inner edge protruding radially outwardly beyond the imaginary tread profile.

* * * * *